United States Patent Office 3,597,324
Patented Aug. 3, 1971

3,597,324
PREPARATION OF THE ANTIBIOTIC RIFAMYCIN SV
Giancarlo Lancini, Pavia, and Carlo Hengeller, Naples, Italy, assignors to Lepetit S.p.A.-Gruppo per la Ricerca Scientifica e la Produzione Chimica Farmaceutica, Milan, Italy
No Drawing. Filed July 12, 1968, Ser. No. 744,327
Claims priority, application Italy, July 13, 1967, 18,343/67
Int. Cl. C07d 9/00
U.S. Cl. 195—80    2 Claims

ABSTRACT OF THE DISCLOSURE

A process is described for preparing directly the antibiotic rifamycin SV by fermenting new mutants of strains of Streptomyces mediterranei.
Said antibiotic was up to now obtained through chemical transformations, starting from other rifamycins, such as rifamycin B.

---

The present invention relates to a new process for the preparation of rifamycin SV, by fermentation of some new mutants of strains of *Streptomyces mediterranei*, which have the property of producing directly the cited antibiotic.

In a previous publication (Antibiotics Annual 1959–60, 262) Sensi et al. describe the production of the antibiotic rifamycin consisting of a mixture of many substances having a similar structure, by fermenting a strain of *Streptomyces mediterranei*. Rifamycin B proved the most interesting among these substances, for which reason it has been tried to improve the yield. The results of one of these researches are described by Margalith et al. in Application Microbiol. 9, 325 (1961), where it is said that the addition of sodium diethylbarbiturate to the fermentation broth improves the yield and the purity of rifamycin B. A following publication (Sensi et al., Il Farmaco, Ed. Sci. 16, 165) relates to the preparation of rifamycin SV, which showed itself as one of the components of the rifamycins family, having higher antibacterial activity, and an important intermediate for the synthesis of other rifamycinic derivatives. Broadly described the procedure consists in submitting rifamycin B to a series of chemical operations, during which it is initially oxidized to rifamycin O, then hydrolyzed to rifamycin S, and finally by the action of a mild reducing agent converted into rifamycin SV. This synthesis, as is apparent, is very laborious, and entails in the different steps, problems of practical order quite difficult of solution, with possible frequent losses of the same antibiotic. Obvious considerations of economical character have induced a search for more simple methods for the preparation of rifamycin SV.

This problem has now been solved by the procedure which forms the subject-matter of the present invention. It has been found in fact that by submitting *Streptomyces mediterranei* to the action of mutagenic agents, either physical (U.V. rays, e.g.) or chemical (mustard gas, N-methyl-N-nitro-N-nitrosoguanidine etc.) or biological (e.g. actinophage), there are obtained mutants of said microorganism, which produce rifamycin SV together with varying amounts of other rifamycins.

The rifamycin SV producing mutants maintain the original taxonomy of *Streptomyces mediterranei*, and their cultural characteristics are practically the same. Only some differences are noted in the formation of aerial mycelium and in the color of soluble pigment when the mutants are grown on some representative culture media. The following is a table giving a comparison between the characteristics of *Streptomyces mediterranei* ATCC 13685 and one of the new mutants, which has been found to be particularly effective in producing high yields of rifamycin SV. The mutant has been deposited with the ATCC (American Type Culture Collection) and received Ser. No. 21,271.

Comparative cultural characteristics of *Streptomyces mediterranei* ATCC 13685 and strain RS20 on some media

| | ATCC 13685 | | | RS20 (ATCC 21271) | | |
|---|---|---|---|---|---|---|
| Medium | Vegetative mycelium | Aerial mycelium | Soluble pigment | Vegetative mycelium | Aerial mycelium | Soluble pigment |
| Starch agar | Hyaline to light brown. | Pinkish white. | Green-yellow to light brown. | Hyaline to orange brown to dark brown. | Absent | Light green-yellow to brown green-yellow. |
| Ca malate glucose agar | do | do | Light yellow | Hyaline to orange yellow | do | Do. |
| Ca malate glycerol agar | Hyaline to light orange. | White light orange. | Scarce, pale orange. | Hyaline to orange yellow to orange brown. | do | Very light green-yellow to brown green-yellow. |
| Bennet agar | Hyaline to orange yellow. | Pinkish white. | Very light yellow brown. | Hyaline to orange yellow to dark red-brown. | do | Brown-yellow to brown-red. |

The media named in the above table had the following composition.

Starch agar: Soluble starch 10 g., $K_2HPO_4$ 1 g., $$MgSO_4 \cdot 7H_2O$$

1 g., NaCl 1 g., $(NH_4)_2SO_4$ 2 g., $CaCO_3$ 2 g., $FeSO_4 \cdot 7H_2O$, $MnCl_2 \cdot 4H_2O$, $ZnSO_4 \cdot 7H_2O$ each 0.001 g., agar Difco 20 g., dist. water to 1000 ml. After sterilization at 120° C. for 20 minutes, pH 6.7–6.8.

Ca malate glucose agar: Glucose 20 g., Ca malate 10 g., $NH_4Cl$ 0.5 g., $K_2HPO_4$ 0.5 g., agar Difco 15 g., dist. water to 1000 ml. After sterilization at 115° C. for 15 minutes, pH 6.5.

Ca malate glycerol agar: Glycerol 10 g., Ca malate 10 g., $NH_4Cl$ 0.5 g., $K_2HPO_4$ 0.5 g., agar Difco 15 g., dist. water to 1000 ml. After sterilization at 115° C. for 15 minutes, pH 6.5–6.6.

Bennet agar: Glucose 10 g., yeast extract 1 g., beef extract 1 g., N-Z-amine A 2 g., agar 15 g., dist. water to 1000 ml. After sterilization, pH 6.7–6.8.

The procedure, both for the fermentation and the extraction, is substantially the same as has been described for the production of rifamycin B, and consists in cultivating one of said mutants of *Streptomyces mediterranei* in a nutrient medium containing assimilable carbon and nitrogen sources and essential mineral salts, until a substantial antibiotic activity is imparted to said medium and in extracting rifamycin SV from the medium. More particularly this mutant is cultivated under stirred and aerated submerged conditions at a temperature ranging from 25 to 37° C., and preferably at 28° C. As sources of carbon the following carbohydrates and carbon derivatives can be used: galactose, lactose, sucrose, maltose, glycerol, mannitol, etc. Useful nitrogen sources are, for instance, amino-acids and their mixtures, peptides, proteins and their hydrolizeds as peptone, yeast extract, soybean meal, corn steep liquor, fish soulbles, meat extract, and aqueous fractions from cereal seeds. The fermentation can be carried out for 96–180 hrs. The starting pH, generally adjusted at about 6.2–6.4, decreases during the course of the fermentation to 5.5–6. Generally the best results are observed at the 180th hour of fermentation. After this time an excellent yield of antibiotic is obtained.

At the end of the fermentation rifamycin SV can be isolated by the following procedure. The fermentation medium is filtered at the final pH of 6.4–6.6. The filtrate is quickly acidified, preferably to a pH lower than about 5, to ensure the best stability to the antibiotic substance. The activity is extracted with water immiscible solvents such as chloroform, butanol, ethyl, propyl, butyl or amyl acetate. The ratio between the volume of the medium and that of the solvent changes dependently on the chosen solvent: generally a ratio ranging from 2:1 to 10:1 is used.

The mycelium still retains a microbiological activity, remarkably higher than that observed in the case of the fermentation of rifamycin B. This activity is extracted from the mycelium by means of a water immiscible solvent, and then combined with the organic phase, already containing most of the rifamycin. Alternatively, the extraction of the activity from the mycelium can be effected by means of a solvent miscible with water such as acetone. In this case the liquid is filtered, the acetone is evaporated in vacuo, the rifamycin is extracted with a water immiscible solvent and the procedure is carried on as said above.

Once most of the antibiotic activity has been transferred into the solvent, this is distilled in vacuo to dryness, preferably at a temperature lower than 30° C.

Rifamycin SV purification can be effected chromatographically on a column prepared with a suitable adsorbing material as silicagel. The rifamycins are dissolved in a suitable organic solvent such as acetone, transferred on the column and eluted with a convenient mixture of solvents as acetone and benzene. The separation of rifamycin SV from the other rifamycins is generally rather sharp, since it has a remarkably higher mobility and can be easily followed owing to the characteristic orange-yellow color of the ring within the column. The eluate containing rifamycin SV is then concentrated in vacuo to dryness. A crystalline orange-yellow residue is obtained.

To the purpose of better illustrating the subject of the invention the following examples are given.

EXAMPLE 1

A suspension of mycelium of *Streptomyces mediterranei* ATCC 13685 is treated with N-methyl-N'-nitro-N-nitrosoguanidine and inoculated on Bennet agar. The colonies surviving the mutagenic treatment are isolated and tested for their ability to inhibit the growth of *Pseudomonas reptilivora* NRRL–B6 cultivated on Penassay seed agar at pH 7.2. Under these conditions rifamycin B is microbiologically inactive, and rifamycin SV producing strains can be selected.

One of these strains, named by us with the abbreviation RS20, is propagated for 6–8 days on Bennet's agar and incubated at 28° C. With the culture obtained from the agar slant, two 500 ml. Erlenmeyer flasks are inoculated under sterile conditions. The flasks contain 100 ml. of the vegetative medium of the following composition:

| | G. |
|---|---|
| Beef extract | 5 |
| Yeast extract | 5 |
| Peptone | 5 |
| Casein hydrolyzate | 3 |
| Glucose | 20 |
| NaCl | 1.5 |

H$_2$O to 1 liter.

The pH is adjusted to 7.3 with NaOH.

The flasks so inoculated are placed on an alternative shaker at 28° C. for 72 hours. The content of the two Erlenmeyer flasks is used as inoculum by pouring it in a 10 liters prefermenter, containing 4 liters of the above mentioned vegetative medium. The incubation is carried out at 28° C. with an agitation of 750 r.p.m. and 1 v./v./m. aeration. After 30 hours of growth a volume of 7–10% of packed cells was obtained. In the next stage a 10 liter glass fermenter containing 4 liters of the hereinafter mentioned fermentation medium is used:

Peanut flour—25 g.
Soybean flour—5 g.
(NH$_4$)$_2$SO$_4$—9.5 g.
MgSO$_4$.7H$_2$O—0.85 g.
Glucose—95 g.
Glycerol—40 g.
KH$_2$PO$_4$—1 g.
Propylene glycol—5 g.
CaCO$_3$—8.5 g.
Na diethylbarbiturate—1.7 g.
CuSO$_4$.5H$_2$O—2.8 mg.
FeSO$_4$.7H$_2$O—8.5 mg.
ZnSO$_4$.7H$_2$O—42.5 mg.
MnSO$_4$.4H$_2$O—3.4 mg.
CaCl$_2$.6H$_2$O—1.7 mg.
(NH$_4$)$_6$Mo$_7$O$_{24}$.4H$_2$O—0.85 mg.
H$_2$O to 1 liter The pH is adjusted to 7.8 with NaOH. Sterilization for 60 minutes at 120° C. After sterilization the pH is 6.4. An amount of the prefermenter content equal to 5% of the fermenter content is used as inoculum.

The fermentation is carried out at 28° C. with a 750 r.p.m. agitation and aerating at a rate of 1 v./v./m. Silicone A is used as antifoam. The culture broth turns to a characteristic red-brown color during the fermentation. After 120 hours of growth a volume of 20–25% of packed cells is obtained. The pH of the broth is 6.0. The highest antibiotic activity is obtained after 180 hours (2000 γ/ml. of rifamycin SV). At this moment the broth is harvested.

EXAMPLE 2

A culture of *Streptomyces mediterranei* RS20, obtained as disclosed in Example 1, is prepared in a flask, under stirring, as described in Example 1. For the preculture it is poured into a 10 liters glass fermenter, containing 4 liters of the following medium:

Glucose—5 g.
Peanut flour—7.5 g.
CaCO$_3$—1.65 g.
MgSO$_4$.7H$_2$O—0.33 g.
KH$_2$PO$_4$—0.33 g.
FeSO$_4$.7H$_2$O—3.3 mg.
ZnSO$_4$.7H$_2$O—16.5 mg.
MnSO$_4$.4H$_2$O—1.3 mg.
H$_2$O to 1 liter The pH is adjusted to 7.5. Sterilization 50 minutes at 120° C. After sterilization the pH value is 6.4. After 38 hours of growth the volume of packed cells is 6–8% of total volume. An inoculum equal to 10% is used for a 20 liters glass fermenter, containing 10 liters of the following fermentation medium:

Corn steep liquor—20 g.
Soybean flour—15 g.
(NH$_4$)$_2$SO$_4$—6 g.
MgSO$_4$.7H$_2$O—0.85 g.
Glucose—100 g.
KH$_2$PO$_4$—1 g.
CaCO$_3$—6 g.
FeSO$_4$.7H$_2$O—8.5 mg.
ZnSO$_4$.7H$_2$O—42.5 mg.
MnSO$_4$.4H$_2$O—3.4 mg.
CuSO$_4$.5H$_2$O—2.8 mg.
COCl$_2$.6H$_2$O—1.7 mg.
H$_2$O to 1 liter The pH is adjusted to 7.8 with NaOH. Sterilization for 50 minutes at 120° C. After sterilization the pH is 6.4. The fermentation is carried out at 28° C. for 150 hours. The pH of the fermentation broth at the harvest is 6.5. The final antibiotic activity is 1600 γ/ml. of rifamycin SV.

The product is extracted, purified by chromatographical route and then crystallized as disclosed in the introductory part. More particularly the chromatography was effected using silica-gel Merck 0.05–0.20 mm., the crude rifamycin dissolved in acetone, then eluted with a benzene-acetone mixture 1:1. The product thus purified shows the chemical-physical characteristics of rifamycin SV. M.P.: begins to decompose at 140° C. $[\alpha]_D^{20} = -3.9°$ (c.=1% in methanol).

The I.R. spectrum shows the following absorption bands: 3440, 2920 (Nujol), 2850 (Nujol), 1700, 1658, 1605, 1545, 1464 (Nujol), 1415, 1375 (Nujol), 1325, 1290, 1260, 1218, 1197, 1164, 1125, 1115, 1102, 1083, 1050, 1020, 976, 962, 950, 930, 915, 898, 871, 845, 830, 801, 785, 772, 760, 750, 717, 703 cm.$^{-1}$.

The visible and U.V. spectrum carried out in phosphate buffer pH=7.3, shows absorption maxima at 223 mμ, 314 mμ and 445 mμ.

We claim:

1. A process for preparing rifamycin SV, which comprises cultivating a mutant of *Streptomyces mediterranei* having the ATCC code number 21271, capable of producing rifamycin SV, in an aqueous nutrient medium, containing an assimilable carbon source, an assimilable nitrogen source and essential mineral salts, under aerobic submerged conditions, until a substantial antibiotic activity is imparted to said medium, and recovering rifamycin SV from the medium.

2. A process for preparing rifamycin SV, which comprises cultivating a mutant of *Streptomyces mediterranei*, having the ATCC code number 21271, capable of producing rifamycin SV in an aqueous nutrient medium, containing an assimilable carbon source, an assimilable nitrogen source and essential mineral salts, under aerobic submerged conditions, at a temperature of 25–37° C., at a starting pH of 6.2–6.4 for 96–180 hrs., until a substantial antibiotic activity is imparted to said medium, and recovering rifamycin SV from the medium.

References Cited

UNITED STATES PATENTS

| | | | |
|---|---|---|---|
| 2,988,490 | 6/1961 | Margalith | 195—80 |
| 3,150,046 | 9/1964 | Sensi et al. | 195—80X |

FOREIGN PATENTS

| | | | |
|---|---|---|---|
| 103,171 | 1/1964 | Norway | 195—80 |

JOSEPH M. GOLIAN, Primary Examiner